Figure 1:
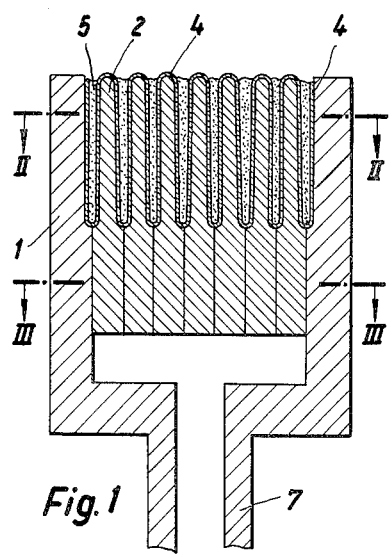

Dec. 28, 1965  HANS-JOACHIM DIETZSCH  3,226,460
METHOD FOR PRODUCING MATERIALS OF HONEYCOMB STRUCTURE
Filed April 12, 1962  3 Sheets-Sheet 1

Inventor:
Hans-Joachim Dietzsch
by: Michael S. Striker
Attorney

Dec. 28, 1965  HANS-JOACHIM DIETZSCH  3,226,460
METHOD FOR PRODUCING MATERIALS OF HONEYCOMB STRUCTURE
Filed April 12, 1962  3 Sheets-Sheet 2
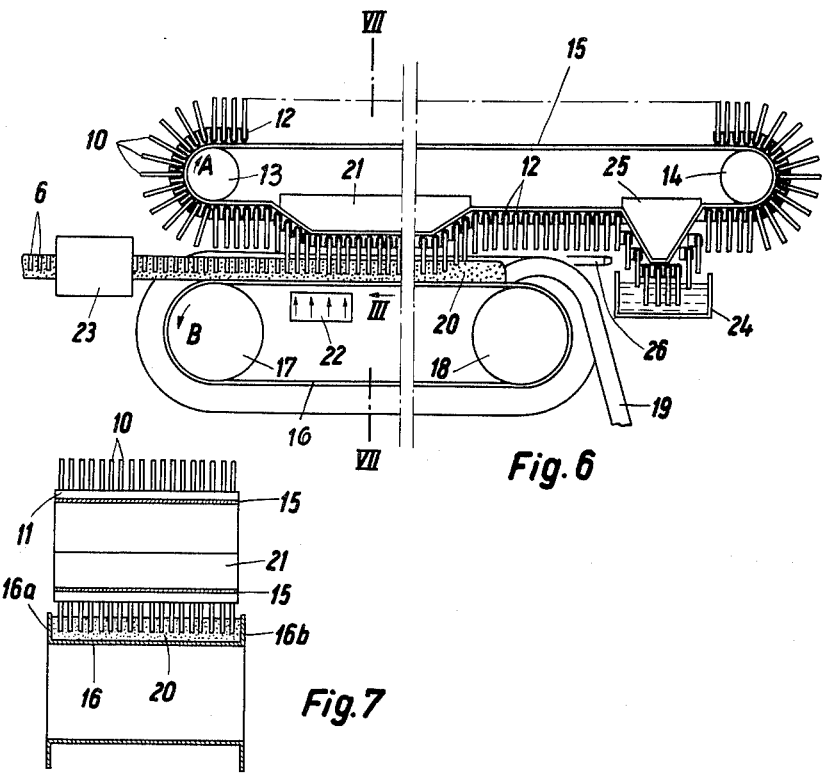
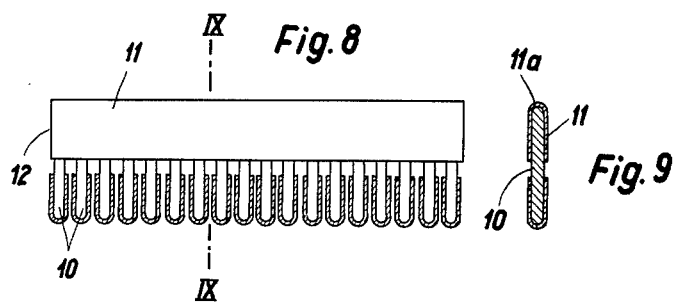
Inventor:
Hans-Joachim Dietzsch
by:
Michael S. Striker
Attorney Dec. 28, 1965     HANS-JOACHIM DIETZSCH     3,226,460
METHOD FOR PRODUCING MATERIALS OF HONEYCOMB STRUCTURE
Filed April 12, 1962                                         3 Sheets-Sheet 3

Inventor:
Hans-Joachim Dietzsch
by:
Michael S. Striker
Attorney

United States Patent Office 3,226,460
Patented Dec. 28, 1965

3,226,460
METHOD FOR PRODUCING MATERIALS OF HONEYCOMB STRUCTURE
Hans-Joachim Dietzsch, Chemin de Bonne Esperance 10, Lausanne, Switzerland
Filed Apr. 12, 1962, Ser. No. 187,104
Claims priority, application Germany, Apr. 14, 1961, D 35,848; Oct. 13, 1961, D 37,230
10 Claims. (Cl. 264—165)

The present invention relates to a method of producing materials of honeycomb or cellular structure.

Materials of cellular or honeycomb structure are widely used for a diversity of purposes, for instance in the form of wall and door panels, for composite sheeting and so forth. They are made for instance by adhesively bonding together small tubular elements, such as short lengths of straw, placed in parallel and normal to the plane of the panel. The primary object of the invention is the production of materials of honeycomb or cellular structure in an economical and industrially easily exploitable way.

Substantially the proposed method comprises the steps of embedding in a layer of soft hardenable material a large number of parallel pins of a cross section which may be between a small fraction of a square millimetre and several square millimetres, and so closely spaced that the cross sectional area of the material between the pins will be less than the cross sectional area occupied by the pins, of hardening the said material with the pins embedded therein and then withdrawing the pins from the hardened material in the direction of their longitudinal axes.

Before the pins are thus embedded in the soft material it is preferred to provide them with a lubricant film, for instance by immersing the pins in a liquid lubricant bath and then solidifying the lubricant film which remains on the pins when they are withdrawn from the bath.

In order to permit this method to be performed in continuous process the soft material may be deposited in the form of a continuous stand on a conveyor means and the pins moved with the aid of a belt travelling parallel to said conveyor means and in synchronism therewith, the pins during said motion being thrust in axial parallelism into said strand of material and at the end of a period of dwell in the material during which the solidity of the material increases being withdrawn therefrom likewise in axial parallel motion.

Alternatively the honeycomb or cellular material may be formed with the aid of assemblies of pins forming combs, by depositing a small portion of the soft rapidly hardening material on a conveyor means, squarely presenting the last of a plurality of combs to said portion and pushing the same into contact with a preceding small portion of material which had been similarly advanced by the preceding comb, in such manner that consecutive small portions of material are combined to form a continuous strand in which the pins of consecutive combs are embedded, each comb, after having thus been pushed forward, being gripped and held between said conveyor means and a belt travelling parallel with the conveyor means in synchronism therewith and, at the end of a predetermined distance of travel, being released from between the conveyor and the travelling belt and vertically withdrawn from the strand of material, the combs then being returned to starting position.

The proposed method can be performed in different ways, for instance by thrusting a large number of pins into a material which is sufficiently soft to permit penetration, and which is then hardened. It is preferred to use a material which hardens so quickly that the pins can be embedded in the same when it is still very soft but which in a very short period of time, for instance in the course of just a few minutes, solidifies to such an extent that the holes which remain when the pins are extracted will retain their shape permanently thereafter. Materials which satisfy this requirement are, for instance, plaster and a wide range of plastics. Hardening may be promoted by the application of heat or by some chemical treatment or by accelerators which are incorporated in the material when this is still soft.

The application of a lubricant to the pins has the primary purpose of permitting the pins to be easily extracted from the material without damage being done to the holes. This is a matter of special importance if the pin axes should not precisely align with the direction in which the pins are extracted. In the absence of a lubricant film a pin which axially slightly deviates from the direction of pin extraction would tend to damage the hole during withdrawal. In the case of pins of greater length such slight deviations are difficult to avoid. The lubricant film should therefore have an appropriate thickness. Primarily, waxy substances are suitable lubricants for coating the pins before they are thrust into or otherwise embedded in the material. Directly before the pins are extracted the strand of material and hence the lubricant are conveniently heated to soften or liquify the lubricant film. The pins will then cleanly pull out of the holes. The lubricant which remains in the holes can finally be removed by flushing it out, for instance by means of warm water.

Preferably the pins should be so closely spaced that the cross sectional area of the material between the holes is less than the cross sectional areas of the holes. The thickness of the material between the holes may be no more than fractions of a millimetre. For instance, when using square section pins to produce a hole of 5 mm. section the thickness of the intervening walls may be as little as 0.2 mm. The pins may have cross sections between 0.1 and 10 sq. mm. and anything between 10 and 1000 pins may be provided per square centimetre.

Figure 2:
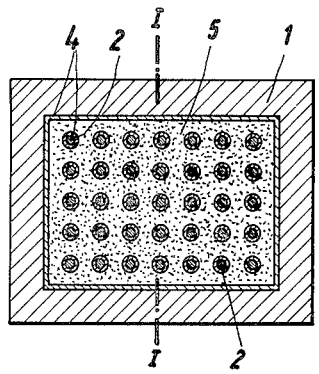
Figure 3:
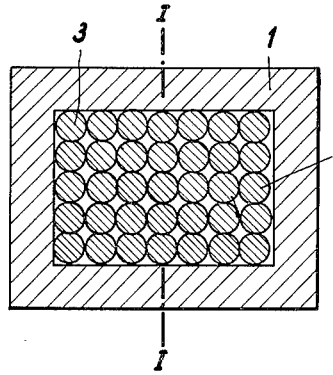
Figure 4:
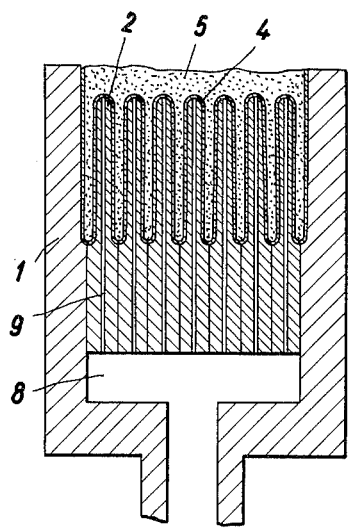
Figure 5:
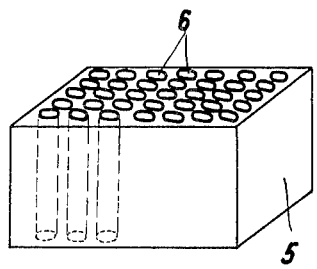
Figure 10:
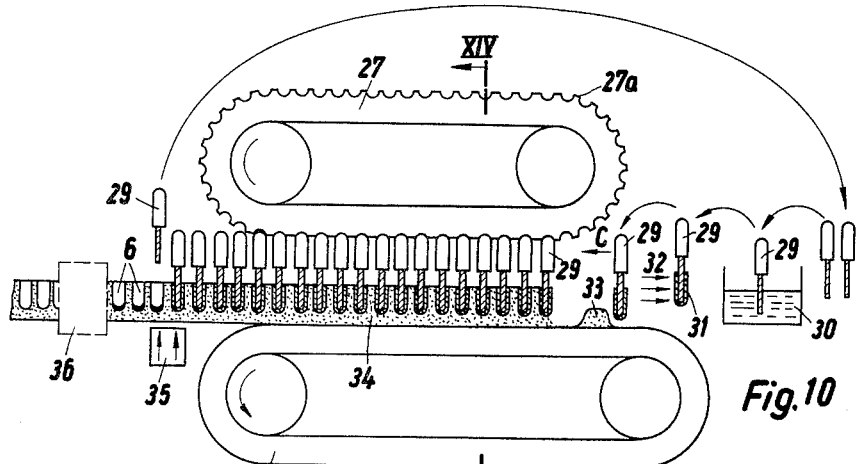
Figures 11, 12, 13:
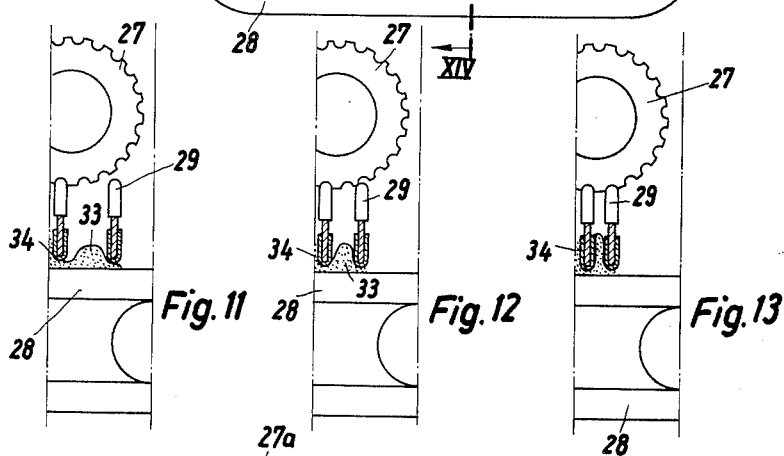
Figures 14, 15, 16:
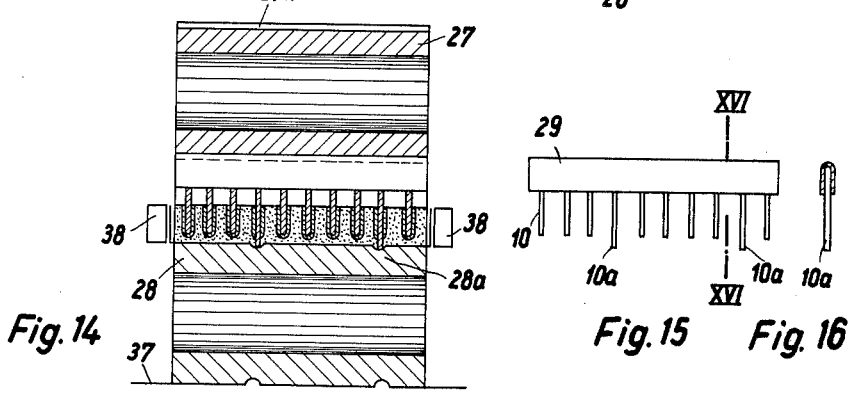

In order to convey a better understanding of the invention embodiments of apparatus for performing the same are illustratively and schematically shown in the accompanying drawings in which FIG. 1 is a sectional elevation taken on the line I—I in FIGS. 2 and 3 of a simple device according to the invention, FIGS. 2 and 3 are sections taken on the lines II—II and III—III respectively of the device shown in FIG. 1, FIG. 4 is a sectional elevation of a modified device resembling that shown in FIG. 1, FIG. 5 is a perspective schematic view of a piece of honeycomb or cellular materal according to the present invention, FIG. 6 is an elevational section of a different type of apparatus according to the invention, FIG. 7 is a section taken on the line VII—VII in FIG. 6, FIG. 8 is a detail of the apparatus shown in FIGS. 6 and 7, FIG. 9 is a section taken on the line IX—IX in FIG. 8, FIG. 10 is an elevational section of yet another embodiment of apparatus according to the invention, FIGS. 11, 12 and 13 show part of the apparatus according to FIG. 10 in different operational stages, FIG. 14 is a section taken on the line XIV—XIV in FIG. 10, FIG. 15 is a view of a comb of pins as used in apparatus according to FIG. 10, and FIG. 16 is a section taken on the line XVI—XVI in FIG. 15.

An assembly of pins 2, each with an enlarged butt 3, is contained in a box-shaped mould 1. The pins 2 have all been provided with a coating 4 of waxy material. The inside surfaces of the mould are likewise covered with such a coating 4, and the mould is filled with a soft hardenable substance, for instance in the form of a polymerisable, thermoplastic or thermosetting, synthetic resin 5.

This material 5 is removed from the mould after it has sufficiently set to permit its removal. This is done by heating the mould 1 including the pins 2 in order to soften the lubricant 4 or at least to render it sufficiently viscous for the moulding to be easily withdrawn even if some of pins 2 are not exactly straight. When the material 5 (FIG. 5) has been taken out of the mould it will contain a large number of holes 6, each of a diameter exceeding the diameter of the pins by the thickness of the lubricant coating 4. Removal of the moulding from the mould is facilitated by the provision of a pipe connection 7 at the base of the mould through which a pressurised medium, such as compressed air, steam, water or oil can be introduced into the space below the butts 3 of the pins 3 inside the mould. By thus introducing a pressurised medium the pins can be ejected from the mould. The moulding 5 can then be easily gripped and the pins pulled out of the same.

The arrangement illustrated in FIG. 4 differs from that shown in FIGS. 1 to 3 in that the pins are provided with fine longitudinal ducts 9 through which the pressure medium entering space 8 can penetrate to the points of the pins and thus effect or at least further assist in freeing and ejecting the moulding 5.

The arrangement in FIG. 4 further differs from that according to FIGS. 1 to 3 in that the points of the pins 2 are situated below the level of the upper edge of the mould 1. Consequently the channels formed by the pins in the finished moulding 5 will not completely traverse the moulding from side to side. In fact one side of the moulding will be unbroken and smooth.

Whereas in FIGS. 1–4 the raw material for forming the moulding is introduced into a mould armed with pins, FIG. 6 shows apparatus for thrusting a train of pins 10 into a continuous strand of material.

In the apparatus according to FIG. 6 rows of needles are fitted into slats or rails 11, each slat with its pins thus forming a kind of reed or comb 12 (FIG. 7). A large number of combs 12 is affixed to an endless travelling belt 15 which travels in the direction of arrow A over two rollers 13 an 14 rotating on horizontal axles, the combs being attached to the belt in such a way that the pins on a horizontal section of belt are erected and point vertically downwards. A second endless belt 16 is arranged to travel over two rollers 17 and 18 revolving on horizontal axles in the direction of arrow B, the speeds of travel of the two belts being the same. From a tube 19 a strand 20 of a soft hardenable material is deposited on belt 16. The belt carries this strand 20 in the direction of arrow III. The two belts 15 and 16 are relatively spaced in such a way that the points of the pins 10 do not touch strand 20. However, a guideway 21 which guides the combs 12 along part of the path of belt 16, presses the pins 10 in this section into the strand 20 in such manner that the pins will nearly completely penetrate the thickness of the strand and then slowly rise out of the strand as belt 15 travels over the final part of the guideway 21. The length of guideway 21 is suitably chosen for the material forming the strand 20 to harden sufficiently from the point of insertion of the pins into the same to the point where the pins are extracted to permit the holes formed by the pins not to be damaged during extraction. Immediately preceding the point where extraction of the pins 10 is arranged to begin heating means 22 are provided which raise the temperature of the strand 20 to cause the lubricant film on the pins to melt. Behind the rear end of the travelling belts 15 and 20 is a device 23 for flushing any remaining lubricant out of the holes 6 in the strand 20. To this end for instance hot water may be injected into the holes 6 by the said device 23.

Belt 16 is shorter than belt 15. Whereas roller 13 vertically aligns with roller 17 so that the ends of the two belts are substantially located in the same vertical plane the beginning of belt 15 precedes the beginning of belt 16 by a given amount. In this region of belt 15 a tank 24 is provided under this belt containing a liquid lubricant, for instance in the form of a wax or bitumen, a wax-or bitumen-containing liquid, an aqueous solution of gelatine or a glue. It is preferred to use a lubricant which spontaneously sets on the pins when the combs have been immersed in the bath. Eligible lubricants are for instance substances which are solid at normal room temperature but become highly viscous or liquefy when the temperature rises for instance to levels below 200° C. or even below 100° C. Located above tank 24 is a further guideway 25 for belt 15 which causes the pins 10 to be lowered into tank 24 and then raised again. The rising pins are exposed to a blast of cold air issuing from a blowing nozzle 26 for hardening the film of lubricant on the pins.

In cross section the conveyor belt 16 has the shape of a shallow trough (FIG. 7) with lateral ledges 16a and 16b which determine the width of the strand 20.

When using a synthetic resin for forming the strand or a material which at least predominantly consists of such a resin, suitable heating or cooling means may be provided where the pins penetrate into the strand and/or where they are extracted again. This will permit the necessary softening and hardening of the material forming the strand to be controlled as desired. For sufficiently softening the lubricant wax before the pins are extracted heating may conveniently be effected for instance by an electric high frequency heating means.

In the apparatus illustrated in FIGS 10 to 14 the strand of cellular material is formed by combs of pins which are not attached to the travelling belt.

The arrangement according to FIG. 10 resembles that shown in FIG. 6 in that it comprises two endless travelling belts 27 and 28 located the one above the other and that the ends of the belts at the discharge end of the apparatus are in exact vertical alignment, the strand of material being formed on the upper section of the bottom belt 28. However, in this embodiment the longer of the two belts is the bottom belt 28. The combs of pins 29 are not attached to the other belt 27. They are loosely fed into the gap between the two belts 27 and 28. In addition to pins 10 which correspond to the pins in FIGS. 8 and 9 the combs include a few pins 10a of greater length than the others. For holding the combs 12 in position the upper travelling belt 27 is provided with transverse flutings 27a which correspond in shape with the backs 11a of the combs (FIG. 16). The bottom conveyor belt 28 is likewise provided with identations 28a (FIG. 14) for engagement of the ends of the longer pins 10a. The flutings and indentations are so disposed that the two belts 27 and 28 are relatively so aligned that the combs 29 are held in exactly upright position between the flutings and the indentations.

Feed means not specially shown in the drawing first deliver the combs 29 into a tank 30 in such manner that the pins 10, 10a are substantially completely immersed in a lubricant bath (for instance of wax) contained in the tank 30. When the pins have thus been coated with a film 31 of lubricant each comb is exposed to a stream of cold air 32 which causes the lubricant film to solidify. Each comb 29 is then transferred to the level of the preceding combs 29 which have already been gripped between the two travelling belts 27 and 28 and the fresh comb is advanced at a speed which exceeds the speed of travel of the travelling belts. A quantity of material 33 is meanwhile deposited on the upper section of the bottom belt 28 and this material is then pushed against the rear end of the strand 34 already formed on the belt and combined therewith by the forward accelerated motion of the fresh comb 29 from the rear. A continuous strand 34 is thus formed portionwise, the pins with a lubricant film being embedded in the strand thus formed. During the forward motion of the strand 34 along the length of belt 27 the material of the strand sufficiently sets for the pins on the combs 29 to be successively extractable without causing damage to the holes in the strand which they leave behind. At the point of extraction or preferably slightly preceding the point of extraction of the pins from the strand means heating means 35 are provided for liquefying the lubricant 31. Consequently the pins of combs 29 can be extracted without substantial quantities of lubricant still adhering thereto. The lubricant remains at the bottom of the holes 6 in the strand of material. A device at 36 removes the lubricant from the holes, for instance by flushing it out with hot water or by evaporating the same.

FIGS. 11 to 13 illustrate consecutive stages in the motion of a comb 29 from the moment its pins make contact with a lump of material 33 just deposited on the bottom belt (FIG. 11) to the moment where the comb is gripped between the upper belt 27 and the lower belt 28 and the lump of material 33 has been pushed up to and combined with the remainder of the strand 34.

The belt 28 in the apparatus according to FIGS. 10 to 14 is not trough-shaped but flat. In order to contain the edges of the strand of material 34 a foil 37 is placed on to the belt 28 and the margins of this foil are held upright by guide means 38 on either side of the upper portion of belt 28.

What I claim is:

1. A method of forming an elongated substantially rigid structure formed with closely spaced parallel bores therethrough in a continuous process comprising the steps of moving a soft hardenable material in one direction; moving a plurality of combs having each a plurality of substantially parallel pins closely spaced from each other in a direction transverse to the one direction in said one direction and individually relative to each other and to said material while maintaining the pins of adjacent combs parallel to each other and to the axes of the bores to be formed in such a manner that free end portions of said pins become embedded in said material; moving subsequently thereto said material and said combs in said one direction while maintaining the position of said combs relative to the material and while the latter hardens about the pins of said combs; and withdrawing each comb individually in direction of the axes of its pins and parallel to the axes of the bores thus formed from the hardened material to form a substantially rigid structure with closely spaced parallel bores therethrough, whereby the material about said bores will not be damaged during the withdrawal of the pins therefrom.

2. A method of forming an elongated substantially rigid structure formed with closely spaced parallel bores therethrough in a continuous process comprising the steps of moving a soft hardenable material in one direction; covering the end portions of pins on a plurality of combs having each a plurality of substantially parallel pins closely spaced from each other in a direction transverse to the one direction with a film of lubricant material; moving said plurality of combs spaced from each other in said one direction and arranged transversely to said one direction in said one direction and individually relative to each other and to said material while maintaining the pins of adjacent combs parallel to each other and to the axes of the bores to be formed in such a manner that free end portions of said pins become embedded in said material; moving subsequently thereto said material and said combs in said one direction while maintaining the position of said combs relative to the material and while the latter hardens about the pins of said combs; and withdrawing each comb individually in direction of the axes of its pins and parallel to the axes of the bores thus formed from the hardened material to form a substantially rigid structure with closely spaced parallel bores therethrough, whereby the material about said bores will not be damaged during the withdrawal of the pins therefrom.

3. A method of forming an elongated substantially rigid structure formed with closely spaced parallel bores therethrough in a continuous process comprising the steps of moving a soft hardenable material in one direction; moving a plurality of combs having each a plurality of substantially parallel pins closely spaced from each other in a direction transverse to the one direction through a bath of lubricant material so that at least free end portions of said pins are covered by a film of lubricant material; moving said plurality of combs spaced from each other in said one direction and arranged transversely to said one direction in said one direction and individually relative to each other and to said material while maintaining the pins of adjacent combs parallel to each other and to the axes of the bores to be formed in such a manner that free end portions of said pins covered with said film of lubricant material become embedded in said material; moving subsequently thereto said material and said combs in said one direction while maintaining the position of said combs relative to the material and while the latter hardens about the pins of said combs; and withdrawing each comb individually in direction of the axes of its pins and parallel to the axes of the bores thus formed from the hardened material to form a substantially rigid structure with closely spaced parallel bores therethrough, whereby the material about said bores will not be damaged during the withdrawal of the pins therefrom.

4. A method of forming an elongated substantially rigid structure formed with closely spaced parallel bores therethrough in a continuous process comprising the steps of moving a soft hardenable material in one direction; moving a plurality of combs having each a plurality of substantially parallel pins closely spaced from each other in a direction transverse to the one direction through a bath of lubricant material so that at least free end portions of said pins are covered by a film of lubricant material; solidifying said film of lubricant material on said end portions of said pins; moving said plurality of combs spaced from each other in said one direction and arranged transversely to said one direction in said one direction and individually relative to each other and to said material while maintaining the pins of adjacent combs parallel to each other and to the axes of the bores to be formed in such a manner that free end portions of said pins covered with said film of lubricant material become embedded in said material; moving subsequently thereto said material and said combs in said one direction while maintaining the position of said combs relative to the material and while the latter hardens about the pins of said combs; heating said material to an extent so as to soften said solidified lubricant film; and withdrawing each comb individually in direction of the axes of its pins and parallel to the axes of the bores thus formed from the hardened material to form a substantially rigid structure with closely spaced parallel bores therethrough, whereby the material about said bores will not be damaged during withdrawal of the pins therefrom.

5. A method of forming an elongated substantially rigid structure formed with closely spaced parallel bores therethrough in a continuous process comprising the steps of moving a soft hardenable material in one direction; moving a plurality of combs having each a plurality of substantially parallel pins closely spaced from each other in a direction transverse to the one direction through a bath of lubricant material so that at least free end portions of said pins are covered by a film of lubricant material; solidifying said film of lubricant material on said end portions of said pins; moving said plurality of combs spaced from each other in said one direction and arranged transversely to said one direction in said one direction and individually relative to each other and to said material while maintaining the pins of adjacent combs parallel to each other and to the axes of the bores to be formed in such a manner that free end portions of said pins covered with said film of lubricant material become embedded in said material; moving subsequently thereto said material and said combs in said one direction while maintaining the position of said combs relative to the material and while the latter hardens about the pins of said combs; heating said material to an extent so as to soften said solidified lubricant film; withdrawing each comb individually in direction of the axes of its pins and parallel to the axes of the bores thus formed from the hardened material to form a substantially rigid structure with closely spaced parallel bores therethrough, whereby the material about said bores will not be damaged during the withdrawal of the pins therefrom; and removing said softened lubricant from said bores.

6. A method of forming an elongated substantially rigid structure with closely spaced bores therethrough in a continuous process comprising the steps of moving a continuous layer of soft hardenable material with a given speed in one direction; moving a plurality of combs spaced from each other in said one direction and having each a plurality of substantially parallel pins closely spaced from each other in a second direction transverse to said first direction with a speed equal to said given speed in said one direction and individually in a direction parallel to the axes of their pins and to the axes of the bores to be formed toward said layer of material so that free end portions of said pins become embedded in said material; moving subsequently thereto said material and said combs in said one direction while maintaining the position of said combs relative to the material and while the latter hardens about the pins of said combs; and withdrawing each comb individually in direction of the axes of its pins and parallel to the axes of the bores thus formed from the hardened material to form a substantially rigid structure with closely spaced parallel bores therethrough, whereby the material about said bores will not be damaged during the withdrawal of the pins therefrom.

7. A method of forming an elongated substantially rigid structure with closely spaced bores therethrough in a continuous process comprising the steps of moving a continuous layer of soft hardenable material with a given speed in one direction; moving a plurality of combs uniformly spaced from each other in said one direction and having each a plurality of parallel pins respectively arranged closely spaced from each other in a plane substantially normal to said one direction parallel to each other with a speed equal to said given speed in said first direction with the free end portions of said pins outside of said layer of soft hardenable material; moving each of said combs individually in the respective plane so that the free end portions of said pins will become embedded in said material while continuing moving said combs in said one direction and while maintaining adjacent combs parallel to each other; moving subsequently thereto said material and said combs in said one direction while maintaining the position of said combs relative to the material and while the latter hardens about the pins of said combs; and withdrawing each comb individually in direction of the axes of its pins and parallel to the axes of the bores thus formed from the hardened material to form a substantially rigid structure with closely spaced parallel bores therethrough, whereby the material about said bores will not be damaged during the withdrawal of the pins therefrom.

8. A method of forming an elongated substantially rigid structure with closely spaced bores therethrough in a continuous process comprising the steps of moving a continuous layer of soft hardenable material with a given speed in one direction; moving a plurality of combs uniformly spaced from each other in said one direction and having each a plurality of parallel pins covered with a film of lubricant and respectively arranged closely spaced from each other in a plane substantially normal to said one direction parallel to each other with a speed equal to said given speed in said first direction with the free end portions of said pins outside of said layer of soft hardenable material; moving each of said combs individually in the respective plane so that the free end portions of said pins will become embedded in said material while continuing moving said combs in said one direction and while maintaining adjacent combs parallel to each other; moving subsequently thereto said material and said combs in said one direction while maintaining the position of said combs relative to the material and while the latter hardens about the pins of said combs; and withdrawing each comb individually in direction of the axes of its pins and parallel to the axes of the bores thus formed from the hardenable material to form a substantially rigid structure with closely spaced parallel bores therethrough, whereby the material about said bores will not be damaged during the withdrawal of the pins therefrom.

9. A method of forming an elongated substantially rigid structure with closely spaced parallel bores therethrough in a continuous process comprising the steps of moving an elongated portion of soft and hardenable material at a given speed in one direction transverse to its elongation; moving the last of a plurality of combs having each a plurality of substantially parallel pins closely spaced from each other in a second direction transverse to said one direction with a second speed greater than said given speed in said one direction in engagement with said elongated portion of material to advance said portion into engagement with the preceding portion which has been similarly advanced by a preceding comb in such a manner that consecutive portions of said material are combined to form a continuous layer in which the end portions of pins of consecutive combs are embedded in parallel relationship; moving said layer and said combs in said one direction at synchronous speed smaller than said second speed while maintaining said pins of adjacent combs parallel to each other and while the material hardens about the end portions of said pins; and withdrawing said combs one by one in direction of the axes of their pins and parallel to the axes of the bores thus formed from the hardened material to form a substantially rigid structure with closely spaced parallel bores therethrough, whereby the material about said bores will not be damaged during the withdrawal of the pins therefrom.

10. A method of forming an elongated substantially rigid structure with closely spaced parallel bores therethrough in a continuous process comprising the steps of moving an elongated portion of soft and hardenable material at a given speed in one direction transverse to its elongation; moving the last of a plurality of combs having each a plurality of substantially parallel pins covered at least at the free end portions thereof with a solidified film of lubricant material and closely spaced from each other in a second direction transverse to said one direction with a second speed greater than said given speed in said one direction in engagement with said elongated portion of material to advance said portion into engagement with the preceding portion which has been similarly advanced by a preceding comb in such a manner that consecutive portions of said material are combined to form a continuous layer in which the end portions of pins of consecutive combs are embedded in parallel relationship; moving said layer and said combs in said one direction at synchronous speed smaller than said second speed while maintaining said pins of adjacent combs parallel to each other and while the material hardens about the end portions of said pins; and withdrawing said combs one by one in direction of the axes of their pins and parallel to the axes of the bores thus formed from the hardened material to form a substantially rigid structure with closely spaced parallel bores therethrough, whereby the material about said bores will not be damaged during the withdrawal of the pins therefrom.

References Cited by the Examiner
UNITED STATES PATENTS

| | | | |
|---|---|---|---|
| 2,346,201 | 4/1944 | Vautier | 18—48 |
| 2,395,920 | 3/1946 | Te Grotenhuis. | |
| 2,604,664 | 7/1952 | Jordan | 264—338 |
| 2,688,152 | 9/1954 | Marco | 18—4 |
| 2,757,415 | 8/1956 | Mathues et al. | 25—99 XR |
| 2,804,653 | 9/1957 | Talalay | 264—338 |
| 2,851,330 | 9/1958 | Taylor | 264—338 |
| 2,967,122 | 1/1961 | Talalay | 154—54 |
| 3,012,284 | 12/1961 | Touhey | 18—48 |
| 3,028,625 | 4/1962 | Dawson | 18—5 |
| 3,043,731 | 7/1962 | Hill | 154—54 |
| 3,048,888 | 8/1962 | Shockley et al. | 18—5 |
| 3,076,226 | 2/1963 | Borton et al. | 18—4 |
| 3,101,244 | 8/1963 | Hood et al. | 264—338 |

ALEXANDER H. BRODMERKEL, *Primary Examiner.*

MORRIS SUSSMAN, ROBERT F. WHITE,
*Examiners.*